United States Patent
Granshaw et al.

(10) Patent No.: US 8,924,932 B2
(45) Date of Patent: Dec. 30, 2014

(54) USING STACK DATA AND SOURCE CODE TO RANK PROGRAM CHANGES

(71) Applicant: International Business Machines Corporation, Armonk, NY (US)

(72) Inventors: David Granshaw, Winchester (GB); Samuel T. Massey, Southampton (GB); Daniel J. McGinnes, Southampton (GB); Martin A. Ross, Portsmouth (GB); Richard G. Schofield, Eastleigh (GB); Craig H. Stirling, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 13/860,564

(22) Filed: Apr. 11, 2013

(65) Prior Publication Data

US 2014/0310688 A1   Oct. 16, 2014

(51) Int. Cl.
*G06F 9/44* (2006.01)
(52) U.S. Cl.
CPC ........................................ *G06F 8/73* (2013.01)
USPC .......................................................... 717/123
(58) Field of Classification Search
CPC .......................................................... G06F 8/77
USPC .......................................................... 717/123
See application file for complete search history.

(56) References Cited

U.S. PATENT DOCUMENTS

| | | | |
|---|---|---|---|
| 7,840,944 B2 | 11/2010 | Brunswig et al. | |
| 8,132,157 B2 | 3/2012 | Dhuvur et al. | |
| 8,196,115 B2 | 6/2012 | Dimpsey et al. | |
| 2006/0168565 A1 | 7/2006 | Gamma et al. | |
| 2009/0327809 A1 | 12/2009 | Joy et al. | |
| 2010/0095278 A1* | 4/2010 | Nageshappa et al. | 717/128 |
| 2012/0054552 A1 | 3/2012 | Artzi et al. | |
| 2013/0047141 A1* | 2/2013 | Shann et al. | 717/128 |
| 2014/0033178 A1* | 1/2014 | Sasikumar | 717/125 |
| 2014/0173561 A1* | 6/2014 | Toub, Stephen H. | 717/123 |

FOREIGN PATENT DOCUMENTS

| | | | |
|---|---|---|---|
| CN | 101872393 A | 10/2010 | |
| CN | 102110048 A | 6/2011 | |

OTHER PUBLICATIONS

"Enterpirse-class centralized version control for the masses"; Apache Subversion; Printed Jan. 28, 2013; <http://subversion.apache.org/>.
"Find work items in the web client"; Printed Jan. 28, 2013; <http://pic.dhe.ibm.com/infocenter/clmhelp/v3ro/topic/com.ibm.team.workitem.doc/topics/t_finding_work_items_web.html>.
"An Agile application lifecycle management (ALM) solution"; Rational Team Concert; Printed Jan. 28, 2013; <http://www-01.ibm.com/software/rational/products/rtc/>.

* cited by examiner

*Primary Examiner* — Philip Wang
(74) *Attorney, Agent, or Firm* — Isaac J. Gooshaw (57) ABSTRACT

A computer accesses a stack data and a source code of a program. The computer searches for a first change made to the program, wherein the first change is one of a change to a method of the program, a change to a class of the program, a change to a method that is invoked by the program, or a change to a class containing a method that is invoked by the program. The computer identifies the first change that was made to the program and determines the probability that the identified first change caused one or both of an error and a regression. The computer generates a ranked list of identified changes based, at least in part, on the probability that the identified first change caused one or both of an error and a regression.

17 Claims, 3 Drawing Sheets

USING STACK DATA AND SOURCE CODE TO RANK PROGRAM CHANGES

FIELD OF THE INVENTION

The present invention relates generally to the field of program development, and more particularly to the identification and ranking of code changes that may have caused program error.

BACKGROUND OF THE INVENTION

The need for a logical way to organize and control revisions has existed for almost as long as writing has been in existence. However, revision control has become much more important, and complicated, with the advent of computer programs.

Large modern software development projects are often developed from complex designs. Often, a software development project can become very complex as the design evolves from the prototype stage to the fully fledged commercialization of the software project. Thus, when developers or others write code based upon a complex design, errors are inevitable. Often, the complexity of the design increases as the software moves from prototyping to commercialization because of additional functionality that is incorporated into the prototype, or from oversights and shortcomings in the design that become apparent to designers and developers over time. Therefore, revision control has become increasingly important for software development.

Often, as a program is developed, program bugs arise from the process of patching, or fixing, problems in the program. As the program bugs are patched, new program bugs can be unexpectedly produced. A program bug is an error, flaw, mistake, failure, or fault in a computer program or system that produces an incorrect or unexpected result, or causes the program to behave in unintended ways. A software regression, is a type of program bug that makes a program feature stop functioning as intended after a certain event, e.g., a program patch is executed. A program performance regression is a type of software regression where the program still functions correctly, but performs slowly or uses more memory when compared to previous versions of the program.

Typically, program bugs arise from mistakes and errors made by people in either a program's source code or design, and a few are caused by compilers producing incorrect code. Program bugs can trigger errors that can in turn have a wide variety of ripple effects, e.g., a systemic spread of an error, with varying levels of inconvenience to the user of the program. Certain program bugs can have subtle effect on a program's functionality, and therefore may go undetected for an extended period of time. In contrast, more serious program bugs may cause the program to completely cease functioning, i.e., a program crash.

In an effort to reduce the time spent tracking down the sources of program bugs, revision control systems are often employed to generate records of the changes made to programs, which can take the form of changesets. A changeset can be helpful in identifying the changes that were made to data included in the program. However, a changeset may not be sufficient to identify the source of a program bug. For example, a changeset may not identify the source of a program bug if the program bug resulted from the interaction of one program with another. Further, as programs are developed numerous updates to line numbering, file names, method classes, and methods can make it very difficult to track down the actual source of a program bug. Tracking down the source of a program bug can be further complicated by compiling errors and errors resulting from two interacting programs being written in different program languages. While revision control systems are helpful in identifying numerous possible causes for a given error, an identification of the actual cause of the error can remain both difficult and time consuming.

SUMMARY

Embodiments of the present invention disclose a method, computer program product, and system for using stack data and source code to rank program changes. A computer accesses a stack data and a source code of a program. The computer searches for a first change made to the program, wherein the first change is one of a change to a method of the program, a change to a class of the program, a change to a method that is invoked by the program, or a change to a class containing a method that is invoked by the program. The computer identifies the first change that was made to the program and determines the probability that the identified first change caused one or both of an error and a regression. The computer generates a ranked list of identified changes based, at least in part, on the probability that the identified first change caused one or both of an error and a regression.

DETAILED DESCRIPTION

A Java™ virtual machine (JVM) is a program which executes certain other programs, namely those containing Java™ byte code instructions. In general, a JVM is often implemented to run on an existing operating system, but can also be implemented to run directly on hardware. A JVM provides a run-time environment in which Java™ byte code can be executed, enabling features such as automated exception handling, which provides root-cause debugging information for every program error (an exception). A JVM is distributed along with Java™ Class Library, which is a set of standard class libraries (in Java™ byte code) that implement the Java™ application programming interface (API). These libraries, bundled together with the JVM, form the Java™ Runtime Environment (JRE).

When a Java™ virtual machine (JVM) encounters hangs (a slowing of program execution), looping code, deadlocks, or an insufficient memory condition, it is common practice to generate a set of Java™ core files. A Java™ core file is a formatted and pre-analyzed text file that is created by the JVM during an event or created by manual intervention. A Java™ core file contains information about the running JVM process, such as the JVM command line, environment information, loaded libraries, snapshot information about all running threads, stack traces and monitors (locks) held by the threads, GC (Garbage Collection) history, and storage management (memory) information. When deadlocks are detected, the deadlock event is recorded in the Java™ core file.

The occurrence of an exception or a thread dump is usually reflected in a Java™ call stack or method stack. In general, a call stack or a method stack is a particular kind of abstract data type. Call stacks and method stacks are collections of data in which the principal (or only) operations on the collection are the addition of an entity to the collection, known as a push, and the removal of an entity, known as a pop. A dump is, in general, a record that illustrates some aspect of a program, often the program activity. A thread dump is a dump of the stacks of all live threads of the program. Thus, a thread dump can be useful for analyzing the activities of the program up to some point in time. If done at intervals, a thread dump can be helpful in diagnosing certain types of program execution problems (e.g. thread deadlock).

In object-oriented programming, a method is a subroutine (or procedure) associated with a class. Methods define the behavior exhibited by instances of the associated class at program run time. Methods have a special property that, at runtime, allow methods to have access to data stored in an instance of the class they are associated with, and are thereby able to control the state of the instance. A call stack is a stack data structure that stores information about the active subroutines, i.e., the methods, of a computer program. The call stack type of stack data structure is also known as an execution stack, control stack, run-time stack, or machine stack, and is often shortened to just "the stack".

Although maintenance of the call stack is important for the proper functioning of most programs, the details are normally hidden and automatic in high-level programming languages. In general, a call stack or method stack are used for several related purposes, a common reason for having a stack is to keep track of the point at which each active subroutine should return control when the subroutine finishes executing. An active subroutine is one that has been called but has yet to complete execution, after which control should be handed back to the point of call. Such activations of subroutines may be nested to any level (recursive as a special case), hence the stack data structure. If, for example, a subroutine named "ChopFruit" calls a subroutine "ChopBanana" from four different places, "ChopBanana" must know where to return to when execution of "ChopBanana" completes. To accomplish this, the address following the call instruction, the return address, is pushed (i.e., added) onto the call stack with each call.

The stack of the running Java™ program is modeled by three interfaces namely a frame, a frames source, and a context. The frame interface encapsulates the data stored in a single stack frame, such as the operand stack and local variables. The frame source interface encapsulates the allocation and layout of frames, and controls a variety of program attributes such as the argument-passing mechanism. The context interface encapsulates the storage and management of the call stack as well as the locking logic required by synchronized methods.

In object-oriented programming an instance is a copy (also called an occurrence) of an object, whether currently executing or not. Instances of a class share the same set of attributes, yet typically differ in what those attributes contain. For example, the class "Employee" would describe the attributes common to all instances of the Employee class. For the purposes of the task being solved, Employee objects can be generally alike, but often vary in such attributes, such as, for example, "name" and "salary". The description of the class itemizes such attributes and defines the operations or actions that are relevant for the class, for example, "increase salary" or "change telephone number." It is common for various instances of an object to be referred to by different names. For example, one instance of the Employee object can then be referred to with the name of "Jane Doe" and another instance of the Employee object can be referred to with the name of "John Doe".

In object-oriented programming, a class is a construct that is used as a blueprint to create instances of itself, which can be referred to as class instances, class objects, instance objects, or objects. A class defines constituent members that enable these class instances to have a given state and behavior. Data field members (member variables or instance variables) enable a class object to maintain a given state. Other kinds of members, especially methods, enable a behavior of the class object. Class instances are of the type of the associated class. A class usually represents a noun, such as a person, a place, a thing, or something that has been nominalized. For example, all fruits, bananas, apples and such would be instances of the class "Fruit" (a "Fruit" object). The instance is of the type "Fruit". This should not be confused with "sub-types of". "Bananas" are a sub-type of "Fruit", but the class of "Bananas" itself would not be an instance of "Fruit".

Given the complexity of many programs, it can be difficult to easily determine the source of a program bug (an error). Often, as a program is developed, many programmers using different computer systems and software interact to update or change numerous aspects of the program. Changes to methods, classes, locking times, objects, and instances can be common, and these changes are typically tracked using revision control systems. However, tracking the changes may not be very useful when many changes have been made that may have caused the error.

The larger and the more complex the program is, the more possible causes there are for an error. A common starting point for identifying the source of an error is an examination of the stack. However, the stack can contain large amounts of data and can still yield many possible sources for the error. Therefore, it can be useful to further reduce the number of possible sources of the error to only those which are most likely to have generated a given error, which can include a regression of the program (a slowing of the program execution speed). By looking at the most probable sources of error first, it may be possible to identify the actual source of error in a much shorter time period. Identifying the most probable source of error is facilitated by a program logging specific stack information when an error occurs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. For the purpose of simplifying the disclosure the disclosed exemplary embodiments have, in general, been configured for use with a Java™ based program. However, this is not to be interpreted as a limitation to Java™ based programs as other exemplary embodiments can be configured for use with other computer programming languages.

Figure 1:
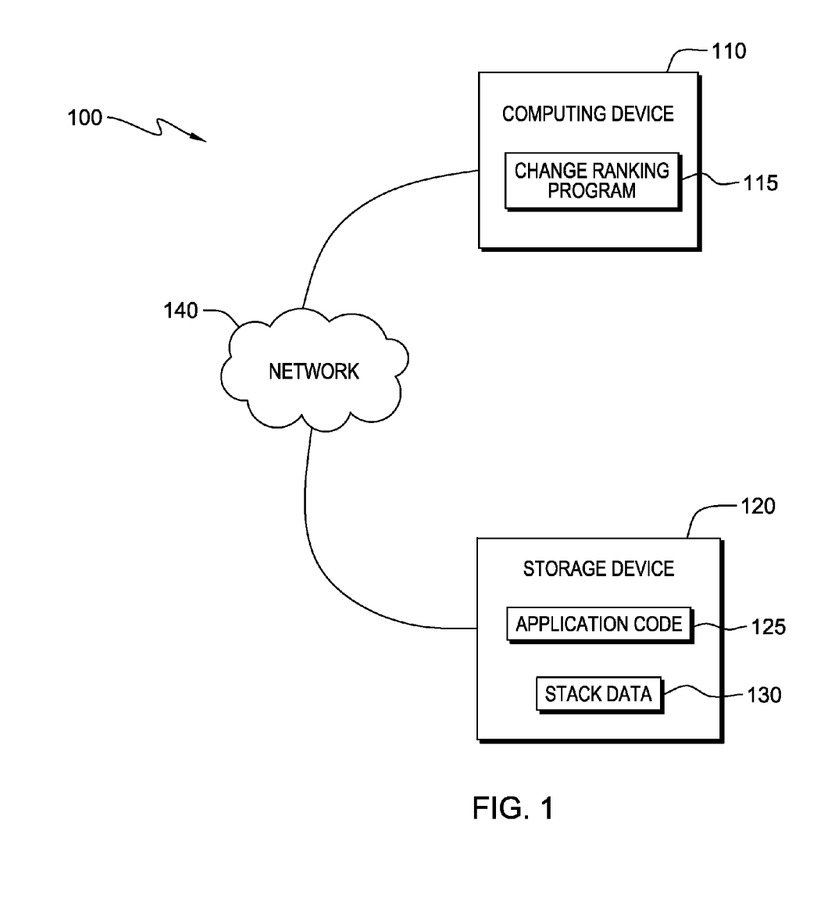
FIG. 1 is a functional block diagram illustrating a program development environment, in accordance with an exemplary embodiment.

FIG. 1 is a functional block diagram illustrating a program development environment, generally designated 100, in accordance with one embodiment of the present invention. Program development environment 100 includes computing device 110 and storage device 120 connected over network 140. Computing device 110 includes change ranking program 115. Storage device 120 includes application code 125, and stack data 130.

In alternative embodiments, change ranking program 115 can be stored externally to computing device 110 and accessed through network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between computing device 110 and storage device 120 in accordance with an exemplary embodiment of the present invention.

In various embodiments of the present invention, computing device 110 is a computing device that can be a standalone device such as a, server, laptop computer, tablet computer, netbook computer, personal computer (PC), or desktop computer. In another embodiment, computing device 110 represents a computing system utilizing clustered computers and components to act as a single pool of seamless resources. In general, computing device 110 can be any computing device or a combination of devices with access to change ranking program 115, application code 125, and stack data 130, and is capable of running change ranking program 115. Computing device 110 may include internal and external hardware components, as depicted and described in further detail with respect to FIG. 3.

In various embodiments of the present invention, storage device 120 is a data storage device in communication with computing device 110. In general, storage device 120 is a data storage device used to store data, such as the data included in application code 125 and stack data 130. Typically, the data included in data included in application code 125, and stack data 130 is accessed as needed by computing device 110 via network 140. In some embodiments, storage device 120 is integral with computing device 110.

In exemplary embodiments, change ranking program 115, in general, uses information included in a stack to query a program code repository to identify changes that may have caused a program error. The identified changes are ranked by change ranking program 115 according to the probability that the change caused a given error. In general, the more probable a given change, to the program, is to have caused the error the higher the given change is ranked. In some exemplary embodiments, an output from change ranking program 115 includes a report that includes a ranked list of the identified changes.

In exemplary embodiments, change ranking program 115 identifies changes between various builds (versions) of a program. Change ranking program 115 also uses the stack data and the program code to identify other methods, which are not indicated by the stack data. Methods not indicated by the stack data are methods that were invoked within the call structure that may have caused the error. In general, the invoked methods are methods that have changed between builds, and are identified within the call structure to a specific depth, herein designated a recursive depth parameter.

Generally, a recursive depth parameter relates to a parent-child method where a parent method calls a child method into execution, thereby forming a "chain" of methods. A change in any one of the child methods may be the cause of the error. In some instances the child method in question can be included in another program and therefore would be more difficult to identify as the cause of the error. Depending on the method, there may be one or several child methods called by a single parent. In summary, by examining the child methods for changes, a more detailed determination of the possible causes for a given error can be made by change ranking program 115.

Generally, in an exemplary embodiment, if the recursive depth parameter exceeds five, then the recursive depth parameter leads to increasing degrees of false positive identification of possible causes of error. For that reason, most recursive depth parameter values would be set to two or three. However, in other embodiments additional filtering techniques can be applied to reduce the number of false positive identifications with increased recursive depth parameter.

In general, in exemplary embodiments, application code 125 is a stored copy of the source code for a given program being developed. Application code 125 can, in some embodiments, include multiple versions of a program with various updates applied to the source code of the program. By comparing the various versions of a program, changes made to the source code can be identified.

In general, in exemplary embodiments, stack data 130 includes information about the active subroutines (methods) of a computer program. More specifically, stack data 130 includes data produced at the time a given program experienced an error or regression. The types of data stored in stack data 130 are not restricted to only stack data. In general, stack data 130 includes data such as the thread state data and the thread stack data of a given program that experienced an error. Stack data 130 also includes the causes of error that are identified along with the reports that are generated by change ranking program 115. In some embodiments, stack data 130 can include other types of data, for example, program patches.

An example of the output of change ranking program 115 is shown, in part, below along with the application of a depth parameter to invoked methods.

A call stack such as:

```
Class3.method1( )
Class2.method2( )
Class2.method1( )
Class1.method2( )
Class1.method1( )
```

A selection of methods such as:

```
Class1 {
    method1( ) { method2( ); }
    method2( ) { Class4.method1( );
                Class2.method1( ); }
}
Class2 {
    method1( ) { method2( ); }
    method2( ) { Class3.method1( ); }
}
Class3 {
    method1( ) { throw Exception( ); }
}
```

Continuing with the above example, after querying the program code repository and identifying the methods that were changed, the classes that were changed, and the invoked methods to, for example, a depth of two. Using a depth of two, change ranking program 115 would identify the following changes and generate a list of possible error sources, such as, for example:

```
Changes identified:
DEFECT 1: Class1.method2( )
DEFECT 2: Class1.method5( )
DEFECT 3: Class4.method1( )
DEFECT 4: Class3.method1( )
```

In continuation of the above example, change ranking program 115 would then determine the most probable causes of the error and generate a report, such as, for example:

| | |
|---|---|
| HIGH- | DEFECT4: Class3.method1( ) modified, |
| | DEFECT1: Class1.method2( ) modified |
| MEDIUM- | DEFECT2: Class 1 modified |
| LOW- | DEFECT3: Class4.method1( ) modified |

In exemplary embodiments, change ranking program 115 identifies changes to methods included in a given program as highly likely to have caused an error and flags them accordingly, e.g., "HIGH". Since changes to a class are considered to be moderately likely to have caused error they are flagged as, for example, "MEDIUM". In general, invoked methods are not likely to have caused error and are therefore flagged accordingly as, for example, "LOW". Using the identified and ranked changes, the most likely causes of a given error can be addressed first, which can reduce the time required to develop/update a program.

Figure 2:
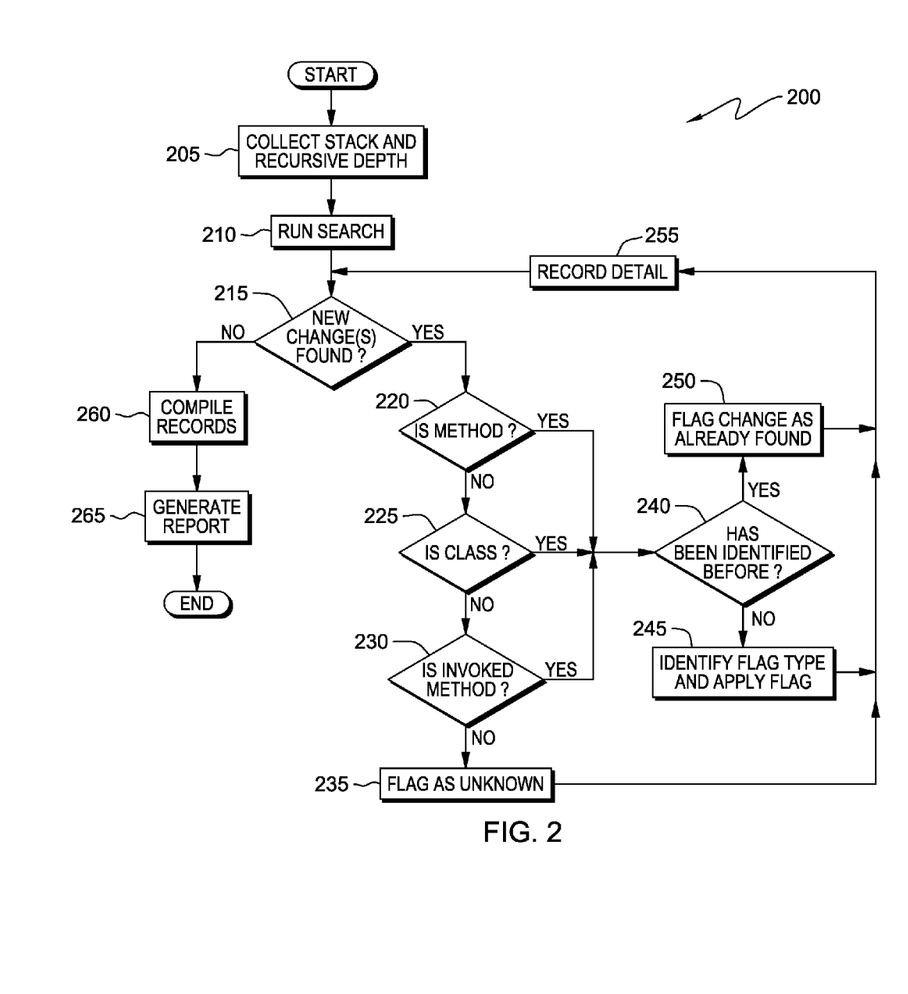
FIG. 2 illustrates operational steps of a change ranking program, on a computing device within the program development environment of FIG. 1, in accordance with an exemplary embodiment.

FIG. 2 is a flow chart, 200, illustrating the operational steps utilized by change ranking program 115 to generate a ranked list of changes that may have caused the error of a program included in application code 125, in accordance with an exemplary embodiment. Typically, the ranked list of changes are included as part of a report that is generated by change ranking program 115. In other embodiments, change ranking program 115 does not generate a report.

In an exemplary embodiment, change ranking program 115, in general, identifies the recursive depth parameter to be applied to a search, along with the stack data, such as a Java™ stack, associated with the program that experienced the error, in step 205. The stack data is retrieved from stack data 130. The recursive depth parameter can be a preset value or can be a value entered by a user.

In an exemplary embodiment, in step 210, change ranking program 115 runs a search, using the recursive depth parameter, the stack data, and program source code that is included in application code 125, to identify potential changes that may have caused the error. In general, the change ranking program 115 queries the source code for changes that occurred between two or more different builds (versions) of the program, which includes changes to methods, classes, and invoked methods. The search using the recursive depth parameter is typically carried out by following a "chain" of methods with respective changes, as discussed previously in the detailed description. For example, if the recursive depth parameter is set to three, then change ranking program 115 follows the reference from a first method, to a second, and stop at the third method. The three identified methods are then designated as potential changes that may have caused the error.

In an exemplary embodiment, in decision step 215, change ranking program 115 determines if there are any new changes found, meaning the changes have not been classified, i.e., flagged as high, medium, low, or unknown (see steps 235 and 245 for further details). If there are new changes found, then change ranking program 115 proceeds to step 220 (decision step 215, yes branch). If there are no new changes found, then change ranking program proceeds to step 260 (decision step 215, no branch). In general, change ranking program 115 is rarely unable to identify any changes that may have caused a program error. However, if there are no changes identified during the search, in step 210, then change ranking program 115 determines that there were no new changes and proceed to step 260.

In an exemplary embodiment, change ranking program 115 proceeds through a series of decision steps to identify the type of change that was found in step 210. In decision step 220, change ranking program 115 determines if the change found is a method change. In decision step 225, change ranking program 115 determines if the change found is a class change. In decision step 230, change ranking program 115 determines if the change found is an invoked method change. If change ranking program 115 is unable to identify the type of change as a method, class, or invoked method change, then change ranking program 115 proceeds to step 235 (decision step 235, no branch) and flags the change as "unknown", indicating that the type of change was not identifiable by change ranking program 115. If change ranking program 115 is able to identify the type of change as a method, class, or invoked method change, then change ranking program 115 proceeds to step 240 (respective yes branches of decision steps 220, 225, and 230).

In an exemplary embodiment, change ranking program 115 determines if the identified change from respective steps 220, 225, or 230 has been identified before, in decision step 240. As changes are identified by change ranking program 115, the changes are included as part of application code 125. To identify whether or not a change has been identified, change ranking program 115 compares a newly identified change to the changes included in application code 125. If the identified change has not been identified before (decision step 240, no branch), then change ranking program 115 proceeds to step 245. If the identified change has been identified before (decision step 240, yes branch), then change ranking program 115 proceeds to step 250 and flags the change as already found. The determination of whether a change has already been identified allows change ranking program 115 to eliminate unnecessary redundancy in the final report (produced in step 265). This can be very useful if the recursive depth parameter is set to any number above one.

In an exemplary embodiment, in step 245, change ranking program 115 identifies and applies the appropriate flag to the changes respectively identified in decision steps 220, 225, and 230. Method changes are flagged as "HIGH" indicating that they are highly likely to have caused a given error. Class changes are flagged as "MEDIUM" indicating that they are moderately likely to have caused a given error. Invoked methods are flagged as "LOW" indicating that they are unlikely to have caused a given error.

In an exemplary embodiment, in step 255, change ranking program 115 records the details associated with the changes respectively flagged in steps 235, 245 and 250. The recorded details relating to the flagged changes form the basis for the report generated and presented by change ranking program 115, in step 265. In general, the details regarding the identified and flagged changes are stored as part of stack data 130.

In an exemplary embodiment, change ranking program 115 compiles the details regarding the identified and flagged changes in step 260. In step 265, change ranking program 115 generates a report that includes the identified changes, which are ranked according to the likelihood that a given change is the cause of a given error.

In certain alternative embodiments, a numerical value can be applied to the identified changes to further differentiate the most likely cause of an error. Additional probability can also be calculated from the level of an error in the stack data. For example, in the table following paragraph 30, a change in Class3.method1( ) would rank higher than a change in Class1.method1( ). The numerical value can, for example, be based on the statistical probability that a given change is responsible for the error. For example, method A is identified as having been changed and is further identified as a child method in ten other methods (B-K) that have been identified as potential causes of the error. Based on the number of occurrences of method A in the total number of identified possible causes, a statistical value is calculated and assigned to method A indicating that method A is likely to have caused the error. Methods B-K, however, receive a lower statistical value due to their low occurrence rate in the identified possible causes of the error.

Figure 3:
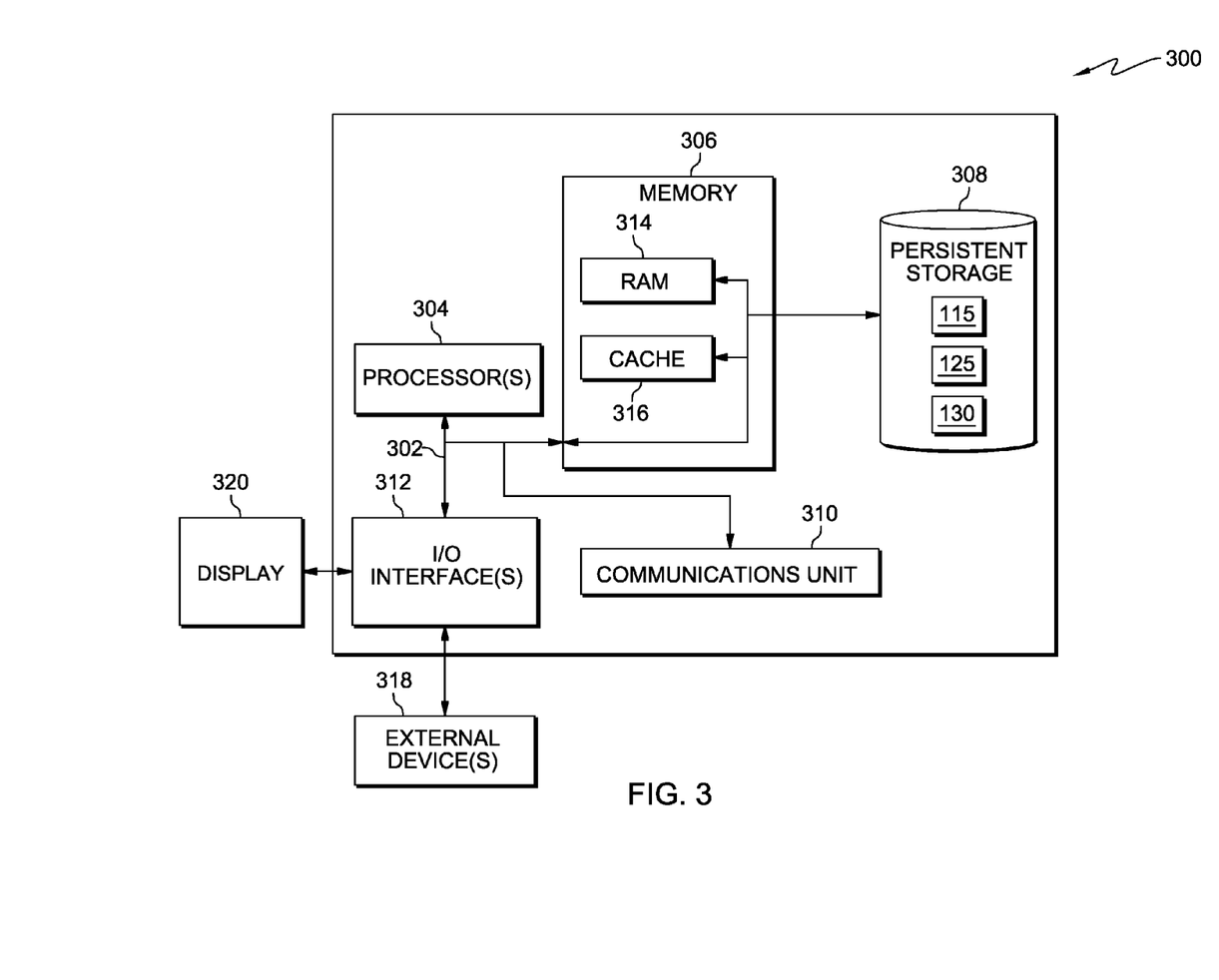
FIG. 3 depicts a block diagram of components of a computing device executing the change ranking program, in accordance with an exemplary embodiment.

FIG. 3 depicts a block diagram, 300, of the components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Change ranking program 115, application code 125, and stack data 130 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of storage device 120. In these examples, communications unit 310 includes one or more network interface cards. Communications unit 310 may provide communications through the use of either or both physical and wireless communications links. Change ranking program 115, application code 125, and stack data 130 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., change ranking program 115, application code 125, and stack data 130, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of using stack data and source code to rank program changes, the method comprising:
   a computer accessing a stack data of a program;
   the computer accessing a source code of the program;
   the computer searching for a first change made to the program, wherein the first change is one of a change to a method of the program, a change to a class of the program, a change to a method that is invoked by the program, or a change to a class containing a method that is invoked by the program;
   the computer identifying the first change that was made to the program; and
   the computer determining a probability that the identified first change caused one or both of an error and a regression, wherein the probability based on one or more of a type of the change, a time when the change was made, a number of changes made, and a frequency of the change being identified;
   the computer generating a ranked list of identified changes based, at least in part, on the probability that the identified first change caused one or both of an error and a regression.

2. The method of claim 1, the method further including the steps of:
   the computer searching for a second change made to the program;
   the computer identifying the second change that was made to the program wherein the second change is one of a change to a method of the program, a change to a class of the program, a change to a method that is invoked by the program, or a change to a class containing a method that is invoked by the program;
   the computer determining a probability that the identified second change caused one or both of an error and a regression;
   the computer ranking the second change and the first change based, at least in part, on the determined probability associated with the first change and the determined probability associated with the second change; and
   the computer generating a ranked list of identified changes based, at least in part, on one or more of the probability that the identified first change caused one or both of the error and the regression, the probability that the identified second change caused one or both of the error and the regression, and the ranking of the second change and the first change.

3. The method of claim 1, wherein the step of the computer searching for a first change made to the program includes:
   the computer using the stack data of the program to query the source code of the program.

4. The method of claim 1, wherein the step of the computer searching for a first change made to the program includes:
   the computer using the stack data of the program and the source code of the program to identify a third change that is not indicated by the stack data of the program, wherein the third change is one of a change made to a method that is invoked by the program, or to a change to a class containing a method that is invoked by the program.

5. The method of claim 1, wherein the step of the computer searching for a first change made to the program includes:
the computer searching for changes using a recursive depth parameter, wherein the recursive depth parameter indicates a range of parent-child method relationships that are followed to identify one or both of a change to a method that is invoked by the program, or a change to a class containing a method that is invoked by the program.

6. The method of claim 1, wherein the stack data of the program includes one or more of a data indicating the active subroutines of the program, a thread state data of the program, and a thread stack data of the program.

7. A computer program product for identifying code changes, the computer program product comprising:
one or more computer-readable storage media computer readable storage medium and program instructions stored on the one or more computer-readable storage media computer readable storage medium, the program instructions comprising:
program instructions to access a stack data of a program;
program instructions to access a source code of the program;
program instructions to search for a first change made to the program, wherein the first change is one of a change to a method of the program, a change to a class of the program, a change to a method that is invoked by the program, or a change to a class containing a method that is invoked by the program;
program instructions to identify the first change that was made to the program;
program instructions to determine a probability that the identified first change caused one or both of an error and a regression, wherein the probability based on one or more of a type of the change, a time when the change was made, a number of changes made, and a frequency of the change being identified; and
program instructions to generate a ranked list of identified changes based, at least in part, on the probability that the identified first change caused one or both of an error and a regression.

8. The computer program product of claim 7, the program instructions further including:
program instructions to search for a second change made to the program;
program instructions to identify the second change that was made to the program wherein the second change is one of a change to a method of the program, a change to a class of the program, a change to a method that is invoked by the program, or a change to a class containing a method that is invoked by the program;
program instructions to determine a probability that the identified second change caused one or both of an error and a regression;
program instructions to rank the second change and the first change based, at least in part, on the determined probability associated with the first change and the determined probability associated with the second change; and
program instructions to generate a ranked list of identified changes based, at least in part, on one or more of the probability that the identified first change caused one or both of the error and the regression, the probability that the identified second change caused one or both of the error and the regression, and the ranking of the second change and the first change.

9. The computer program product of claim 7, wherein the program instructions to search for a first change made to the program includes:
program instructions to use the stack data of the program to query the source code of the program.

10. The computer program product of claim 7, wherein the program instructions to search for a first change made to the program includes:
program instructions to use the stack data of the program and the source code of the program to identify a third change that is not indicated by the stack data of the program, wherein the third change is one of a change made to a method that is invoked by the program, or to a change to a class containing a method that is invoked by the program.

11. The computer program product of claim 7, wherein the program instructions to search for a first change made to the program includes:
program instructions to search for changes using a recursive depth parameter, wherein the recursive depth parameter indicates a range of parent-child method relationships that are followed to identify one or both of a change to a method that is invoked by the program, or a change to a class containing a method that is invoked by the program.

12. The computer program product of claim 7, wherein the stack data of the program includes one or more of a data indicating the active subroutines of the program, a thread state data of the program, and a thread stack data of the program.

13. A computer system for identifying code changes, the computer system comprising:
one or more computer processors;
one or more computer readable storage medium;
program instructions stored on the computer readable storage medium for execution by at least one of the one or more processors, the program instructions comprising:
program instructions to access a stack data of a program;
program instructions to access a source code of the program;
program instructions to search for a first change made to the program, wherein the first change is one of a change to a method of the program, a change to a class of the program, a change to a method that is invoked by the program, or a change to a class containing a method that is invoked by the program;
program instructions to identify the first change that was made to the program;
program instructions to determine a probability that the identified first change caused one or both of an error and a regression, wherein the probability based on one or more of a type of the change, a time when the change was made, a number of changes made, and a frequency of the change being identified; and
program instructions to generate a ranked list of identified changes based, at least in part, on the probability that the identified first change caused one or both of an error and a regression.

14. The computer system of claim 13, the program instructions further including:
program instructions to search for a second change made to the program;
program instructions to identify the second change that was made to the program wherein the second change is one of a change to a method of the program, a change to a class of the program, a change to a method that is invoked by the program, or a change to a class containing a method that is invoked by the program;

program instructions to determine a probability that the identified second change caused one or both of an error and a regression;

program instructions to rank the second change and the first change based, at least in part, on the determined probability associated with the first change and the determined probability associated with the second change; and program instructions to generate a ranked list of identified changes based, at least in part, on one or more of the probability that the identified first change caused one or both of the error and the regression, the probability that the identified second change caused one or both of the error and the regression, and the ranking of the second change and the first change.

15. The computer system of claim 13, wherein the program instructions to search for a first change made to the program includes:

program instructions to use the stack data of the program to query the source code of the program.

16. The computer system of claim 13, wherein the program instructions to search for a first change made to the program includes:

program instructions to use the stack data of the program and the source code of the program to identify a third change that is not indicated by the stack data of the program, wherein the third change is one of a change made to a method that is invoked by the program, or to a change to a class containing a method that is invoked by the program.

17. The computer system of claim 13, wherein the program instructions to search for a first change made to the program includes:

program instructions to search for changes using a recursive depth parameter, wherein the recursive depth parameter indicates a range of parent-child method relationships that are followed to identify one or both of a change to a method that is invoked by the program, or a change to a class containing a method that is invoked by the program.

* * * * *